United States Patent

Cennini et al.

(10) Patent No.: US 8,818,041 B2
(45) Date of Patent: *Aug. 26, 2014

(54) METHOD OF CONTROLLING A FUNCTION OF A DEVICE AND SYSTEM FOR DETECTING THE PRESENCE OF A LIVING BEING

(71) Applicant: Koninklijke Philips N.V., Eindhoven (NL)

(72) Inventors: Giovanni Cennini, Eindhoven (NL); Vincent Jeanne, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/033,666

(22) Filed: Sep. 23, 2013

(65) Prior Publication Data

US 2014/0023235 A1  Jan. 23, 2014

Related U.S. Application Data

(63) Continuation of application No. 13/254,863, filed as application No. PCT/IB2010/050869 on Mar. 1, 2010, now Pat. No. 8,542,878.

(30) Foreign Application Priority Data

Mar. 6, 2009 (EP) .................................. 09154491

(51) Int. Cl.
*G06K 9/00* (2006.01)
(52) U.S. Cl.
USPC ............................ 382/103; 382/128; 382/115
(58) Field of Classification Search
None
See application file for complete search history.

(56) References Cited

U.S. PATENT DOCUMENTS

| 4,958,638 A | 9/1990 | Sharpe et al. |
| 5,719,950 A | 2/1998 | Osten et al. |

(Continued)

FOREIGN PATENT DOCUMENTS

| CN | 1613425 A | 5/2005 |
| CN | 1814322 A | 8/2006 |

(Continued)

OTHER PUBLICATIONS

Verkruysse et al: "Remote Plethysmographic Imaging Using Ambient Light"; Optics Express, vol. 16, No. 26, Dec. 2008, pp. 21434-21445.

(Continued)

*Primary Examiner* — Bhavesh Mehta
*Assistant Examiner* — Siamak Harandi

(57) ABSTRACT

A method of controlling a function of a device, includes obtaining a sequence (19;34;48) of digital images taken at consecutive points in time. At least one measurement zone (25) including a plurality of image points is selected. For at least one measurement zone (25), a signal (30;41;55) representative of at least variations in a time-varying value of a combination of pixel values at at least a number of the image points is obtained and at least one characteristic of the signal (30;41;55) within at least a range of interest of its spectrum relative to comparison data is determined. The determination comprises at least one of:

(i) determining whether the signal (30;41;55) has a spectrum with a local maximum at a frequency matching a comparison frequency to a certain accuracy; and (ii) determining whether at least a certain frequency component of the signal (30;41;55) is in phase with a comparison signal to a certain accuracy. The function is controlled in dependence on whether the determination is positive.

26 Claims, 6 Drawing Sheets

(56) References Cited

U.S. PATENT DOCUMENTS

| | | | |
|---|---|---|---|
| 5,995,856 | A | 11/1999 | Mannheimer et al. |
| 7,354,380 | B2 | 4/2008 | Volpe, Jr. |
| 7,507,203 | B2 | 3/2009 | Sebastian et al. |
| 7,697,766 | B2 * | 4/2010 | Hammoud et al. ............ 382/225 |
| 2003/0163032 | A1 | 8/2003 | Terry |
| 2004/0218787 | A1 | 11/2004 | Tagami et al. |
| 2005/0058456 | A1 | 3/2005 | Yoo |
| 2007/0024946 | A1 | 2/2007 | Panasyuk et al. |
| 2008/0045847 | A1 | 2/2008 | Farag et al. |
| 2008/0227203 | A1 | 2/2008 | Farag et al. |
| 2008/0273768 | A1 | 11/2008 | Dennis et al. |
| 2009/0018409 | A1 | 1/2009 | Banet et al. |
| 2009/0082642 | A1 | 3/2009 | Fine |
| 2009/0141124 | A1 | 6/2009 | Liu et al. |
| 2009/0225827 | A1 | 9/2009 | Sang et al. |
| 2011/0251493 | A1 | 10/2011 | Poh et al. |

FOREIGN PATENT DOCUMENTS

| | | |
|---|---|---|
| CN | 101112307 A | 1/2008 |
| CN | 101299967 A | 11/2008 |
| EP | 1764034 A2 | 3/2007 |
| EP | 2087837 A1 | 8/2009 |
| WO | 8804152 A1 | 6/1988 |
| WO | 0044274 A2 | 8/2000 |
| WO | 0167960 A2 | 9/2001 |
| WO | 2004093676 A1 | 11/2004 |
| WO | 2005051190 A1 | 6/2005 |
| WO | 2008129482 A2 | 10/2008 |
| WO | 2010100594 A2 | 9/2010 |

OTHER PUBLICATIONS

Viola et al: "Robust Real-Time Object Detection"; Proceedings of IEEE Second Internatioanl Workshop on Statistical and Computational Theories of Vision-Modeling, Learning and Computing, and Sampling, Vancouver, Canada, Jul. 2001, 25 Page Article.

De Haan et al: "True-Motion Estimation With 3-D Recursive Search Block Matching"; IEEE Transactions on Circuits and Systems for Video Technology, vol. 3, No. 5, Oct. 1993, pp. 368-379.

Takano et al:"Heart Rate Measurement Based on a Time-Lapse Image"; Science Direct, Medical Engineering & Physics, vol. 29, 2007, pp. 853-857.

Yang et al: "Vital Sign Estimation From Passive Thermal Video"; IEEE Conference on Computer Vision and Pattern Recognition, 2008, CVPR, Jun. 2008, pp. 1-8.

Mohan et al: "Contact-Less, Multi Spectral Imaging of Dermal Perfusion"; IEEE Instrumentation and Measaurement Technology Conference, May 2008, Vancouver Island, Canada, pp. 793-796.

Wieringa et al: "Contactless Multiple Wavelength Photoplethysmographic Imaging: A First Step Toward 'sPO2 Camera' Technology"; Annals of Biomedical Engineering, August 20005, vol. 33, No. 8, pp. 1034-1041.

Hu et al: "Feasibility of Imaging Photoplethysmography"; IEEE International Conference on Biomedical Engineering and Informatics, May 2008, pp. 72-75.

Viola et al: "Robust Real-Time Face Detection"; International Journal of Computer Vision, vol. 57, No. 2, pp. 137-154, 2004.

Hulsbusch, m:"Ein Bildgestutztes, Funktionelles Verfahren Zur Optoelektronischen Erfassung Der Hautperfusion"; Dissertation Technischen Hochschule Aachen, Jan. 28, 2008, 145 Page Document.

Lucchese et al: Color Image Segmentation: A State-of-the-Art Survey: Proceedings of the Indian Natioanl Science Academy, New Dehli, India, Part A Physical Sciences, vol. 67, No. 2, Mar. 1, 2001, pp. 207-221.

Jens-Rainer: "Multimedia Communication Technology"; Multimedia Communication Technology, Jan. 2004, pp. 297-310.

Niebles et al: "Unsupervised Learning of Human Action Categories Using Spatial-Temporal Words"; Int. J. Comp. Vision, vol. 79, Issue 3, Sep. 2008, pp. 299-318.

Wu: "PPGI:New Development in Noninvasive and Contactless Diagnosis of Dermal Perfusion Using Near Infrared Light"; J. of the GCPD e.V., vol. 7, No. 1, Oct. 2003, pp. 17-24.

Wu et al: "Movement Artifact Reduction Strategies for Contactless Acquisition of Mapped Hemodynamic Data"; Institute of High Frequency Technology, Proceedings of the 9th Internaitonal Symposium of Computer-Aided Vascular Diagnostic, 2001, pp. 59-66.

* cited by examiner

METHOD OF CONTROLLING A FUNCTION OF A DEVICE AND SYSTEM FOR DETECTING THE PRESENCE OF A LIVING BEING

CROSS-REFERENCE TO PRIOR APPLICATIONS

This application is a continuation of co-pending U.S. patent application Ser. No. 13/254,863, filed Sep. 6, 2011, which is a U.S. National Stage Application under 35 U.S.C. §371 of International Application No. PCT/IB2010/050869, filed on Mar. 1, 2010, which claims the benefit of European Patent Application No. 09154491.6, filed Mar. 6, 2009. These prior applications hereby are incorporated herein by reference.

FIELD OF THE INVENTION

The invention relates to a method of controlling a function of a device.

The invention also relates to a system for detecting the presence of a living being.

The invention also relates to a computer program.

BACKGROUND OF THE INVENTION

Verkruysse et al., "Remote plethysmographic imaging using ambient light", *Optics Express*, 16 (26), 22 Dec. 2008, pp. 21434-21445 demonstrates that photoplethysmography signals can be measure remotely on the human face with normal ambient light as the source and a simple digital, consumer-level photo camera in movie mode. After setting the camera in movie mode, volunteers were asked to sit, stand or lie down to minimize any movements. Color movies were saved by the camera and transferred to a personal computer. Pixel values for the red, green and blue channels were read for each movie frame, providing a set of PV(x,y,t), where x and y are horizontal and vertical positions, respectively and t is time corresponding to the frame rate. Using a graphic user interface, regions of interest (ROI) were selected in a still (selected from the movie) and the raw signal $PV_{raw}(t)$ was calculated as the average of all pixel values in the ROI. Fast Fourier Transforms were performed to determine the power and phase spectra. A phase map for the heart rate frequency of 1.43 Hz is shown in one of the figures. The article mentions that the authors tried briefly to use a telelens in combination with one of their cameras, because there is interest in remote sensing of the heart rate for combat triage or for athletic monitoring purposes.

Applications of photoplethysmography known from the prior art are limited to diagnostics using heart rate and respiration determinations and using imaging.

SUMMARY OF THE INVENTION

It is an object of the invention to provide a method, system and computer program of the types mentioned above in the opening paragraphs that use input obtained by unobtrusive physiological measurement.

This object is achieved by the method according to the invention, which includes:
obtaining a sequence of digital images taken at consecutive points in time;
selecting at least one measurement zone including a plurality of image points; for at least one measurement zone,
obtaining a signal representative of at least variations in a time-varying value of a combination of pixel values at at least a number of the image points, and
determining at least one characteristic of the signal within at least a range of interest of its spectrum relative to comparison data, the determination comprising at least one of:
(i) determining whether the signal has a spectrum with a local maximum at a frequency matching a comparison frequency to a certain accuracy; and
(ii) determining whether at least a certain frequency component of the signal is in phase with a comparison signal to a certain accuracy; and
controlling the function in dependence on whether the determination is positive.

Determining whether the signal has a spectrum with a local maximum matching a comparison value to a certain accuracy may involve determining whether a local maximum falls within a comparison range.

The method is based on the surprising appreciation that it is possible to detect whether persons, or persons with certain types of characteristics, are present in a particular environment by carrying out an analysis on a sequence of images of the environment that is aimed at finding people's heart rate or respiration rate. Thus, a method that had hitherto been conceived only for diagnostic purposes find a new and useful application in an unobtrusive monitoring method. Because the method includes obtaining a sequence of digital images taken at consecutive points in time, it is unobtrusive. There is no use of sensors to be brought into close proximity with a person. It is also unobtrusive because the method includes selecting at least one measurement zone including a plurality of image points and, for each measurement zone, obtaining a signal representative of at least variations in a time-varying value of a combination of pixel values at at least a number of the image points. The use of combinations such as spatial averages over measurement zones results in a signal with a relatively high signal-to-noise ratio, from which a spectral peak corresponding to a periodic physiological phenomenon such as heart beat or respiration can be extracted to sufficient degree of accuracy. This robustness allows the use of images recording reflected ambient light, so that the method is unobtrusive.

In an embodiment of the method, the comparison data are based on at least one signal representative of at least variations in a time-varying value of a combination of pixel values at at least a number of image points of a further selected measurement zone.

An effect is that the method allows one to determine how many different living beings are represented in the images. Different phases or different frequency values at which the local maxima in the spectra occur are indicative of different living beings.

In a variant of this method, each further selected measurement zone is one of a number of measurement zones in a grid laid over the images.

An effect is that the image area is covered completely. This effect is also obtained, incidentally, if fewer than all sectors of the grid are selected, provided they are spaced apart. In this variant of the method, a preceding step of identifying regions with shapes, colors or other image properties that suggest that they might correspond to body parts can be omitted. Because such a step can have a high error rate, this improves the accuracy of detection of living beings. Because the measurement zones each include a plurality of image points and a time-varying value of a combination of pixel values at at least a number of the image points is formed, there is a low susceptibility to noise. Moreover, fewer signals need be formed than if each pixel were to be compared with others individually.

In another variant, the determination of whether at least a certain frequency component of the signal is in phase with a comparison signal to a certain accuracy is only carried out if the signals obtained for the measurement zone and at least one further measurement zone spaced apart therefrom have spectra with respective local maxima at a frequency common to the measurement zone and the at least one further measurement zone to a certain accuracy.

An effect is that it is not necessary to construct a phase map covering the whole image area. Only those image segments that may or may not represent the same living being because the frequency of the local maximum is the same are analyzed further by determining whether there is a phase difference. Thus, even where two living beings represented in the images have approximately the same heart rate or respiration rate, they can still be distinguished from one another.

In an embodiment of the method, the device includes at least one device for providing a perceptible output, and wherein the method includes controlling the device to provide spatially targeted output differentiated by spatial target in dependence on whether a determination made for a measurement zone corresponding to a target is positive. Thus, upon detecting the presence of a living being, it is possible to target feedback at that living being. The measurement zone's location in the images provides the information for locating the target.

In a variant, for at least one measurement zone corresponding to a target, the perceptible output is adapted in dependence on a value of the frequency of the local maximum.

This variant has the effect of enabling feedback to be targeted at individuals that is appropriate to their current mental state as deduced from the frequency of a periodic physiological phenomenon. This phenomenon can be respiration or heartbeat for example. In a system such as an ambient system, the ambience can be divided into sectors with different atmospheres, each appropriate to the mood of the person or persons in that sector.

In an alternative embodiment, at least one device is made operative in dependence on whether the determination is positive.

This method can be implemented in a parental control function or an energy-saving function. The at least one device is made operative upon detecting the presence of a living being or of a living being of a certain type.

In a variant of this embodiment, the device of which the function is controlled is included in a conditional access system.

An effect is that an unobtrusive check is made of whether the person seeking access is actually presenting his or her credentials in person. In particular where the credentials are checked by a biometric scanning device, this feature helps avoid attempts to gain access using reproductions of biometric features (wax casts of fingerprints, photographic reproductions of irises, etc.).

In an embodiment, the sequence of digital images is caused to be captured by a camera upon completion of an initialization phase, the initialization phase including:
measuring periodic intensity fluctuations in at least parts of images acquired by the camera whilst camera settings are varied, and
selecting values of the camera settings at which measured periodic intensity fluctuations in at least a range of frequencies are determined to be minimal.

This embodiment allows one to remove sources of periodic disturbances, e.g. at the mains frequency. Typically, such disturbances correspond to periodic fluctuations in ambient lighting. Because the method is suitable for remote imaging, these disturbances play more of a role than would be the case if one were to use e.g. an infrared light source and camera. Suitable camera settings include the frame rate, exposure time, camera gain and pixel clock.

An embodiment of the method includes determining a correction signal corresponding to a time-varying value of a combination of pixel values at at least a number of image points in an image part other than a measurement zone, and for each measurement zone, decorrelating at least one of the pixel data of the images in at least the measurement zone and the time-varying value of a combination of pixel values at at least a number of the image points in the measurement zone from the correction signal.

This embodiment allows one to move non-periodic disturbances from the analysis, further improving the signal to noise ratio of the signal components due to periodic physiological phenomena. An example would be the reflections of a television signal in the face of a person watching television whilst the sequence of images is captured. It is noted that the image part other than the measurement zone may be a larger image part that also encompasses the measurement zone.

According to another aspect, the system for detecting the presence of a living being according to the invention includes:

an interface for obtaining a sequence of digital images taken at consecutive points in time;

an image data processing system, configured to:

select at least one measurement zone including a plurality of image points;

for at least one measurement zone, to obtain a signal representative of at least variations in a time-varying value of a combination of pixel values at at least a number of the image points, and to determine at least one characteristic of the signal within at least a range of interest of its spectrum relative to comparison data, the determination comprising at least one of:

(i) determining whether the signal has a spectrum with a local maximum at a frequency matching a comparison frequency to a certain accuracy; and (ii) determining whether at least a certain frequency component of the signal is in phase with a comparison signal to a certain accuracy; and to adapt its output in dependence on whether a determination is positive.

This system is able to detect whether, and optionally how many, living beings are present in an environment depicted in a sequence of images. It is thus able to discern between real living beings and pictures of living beings that may also be present in the environment. It is able to do so in an unobtrusive manner, since it does not rely on sensors that require contact with or proximity to the living beings to be detected.

In an embodiment, the image data processing system is configured to carry out a method according to the invention.

According to another aspect of the invention, there is provided a computer program including a set of instructions capable, when incorporated in a machine-readable medium, of causing a system having information processing capabilities to perform a method according to the invention.

BRIEF DESCRIPTION OF THE DRAWINGS

The invention will be explained in further detail with reference to the accompanying drawings, in which.

DETAILED DESCRIPTION

Figure 1:
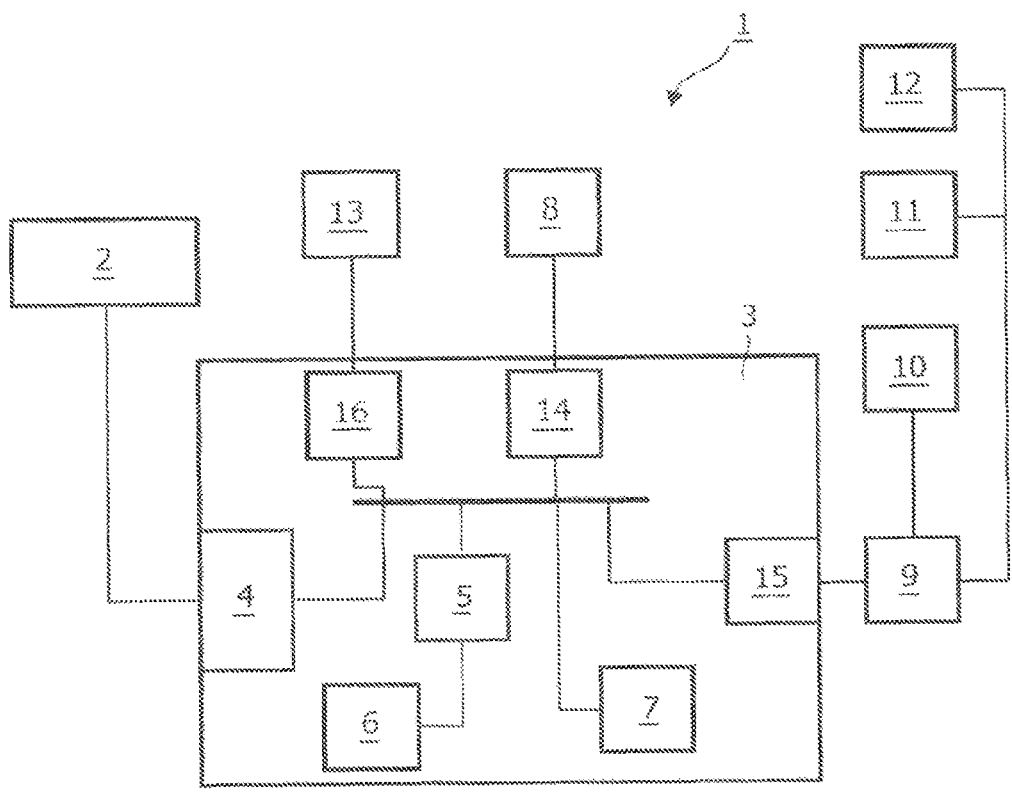
FIG. 1 is a schematic diagram of a system arranged to adapt its output in dependence on whether it has detected the presence of a living being or on the heart rate or respiration rate of a living being.

Referring to FIG. 1, an example is given here of a system 1 that is arranged to process a sequence of images. The system 1 carries out this processing in order to determine at least one of the presence and a frequency value of at least one peak in a spectrum of a signal based on the pixel data of the images corresponding to a frequency of a periodic physiological phenomenon. In certain embodiments, the presence of a living being is inferred from the presence of the peak, and used as a binary input for one or more system processes. The frequency of the peak is used as an input in at least one of those processes. In other embodiments, the presence of several different living beings is inferred. In one embodiment, this information is used as an input to an image segmentation method. In another embodiment, this information is used to provide spatially targeted feedback.

The system 1 includes a digital camera 2 arranged to record a sequence of digital images in quick succession. The system 1 further includes a data processing device 3 which is in communication with the digital camera 2 for the purpose of obtaining the image data, but also to control the operation of the digital camera 2, as will be explained.

The digital image data captured by the digital camera 2 is passed to the data processing device 3 via an interface 4 of the data processing device 3. In the illustrated embodiment, the data processing device 3 includes a processing unit 5 and main memory 6, as well as a data storage device 7 for non-volatile storage of data, e.g. the digital image data and software enabling the data processing device 3 to process the image data and control a number of peripheral devices.

In the illustrated embodiment, the peripheral devices include a video display system 8; an ambient system including a controller 9 and lighting units 10-12; and a biometric scanning device 13. All are connected to the data processing device 3 via respective interfaces 14-16. These peripheral devices are just examples of peripheral devices that can be controlled in dependence on the results of one or more variants of image processing methods to be described with reference to FIGS. 2-4. The video display system 8 in one embodiment comprises a wall covered with light and sound tiles. In another embodiment, it comprises a projection system. In yet another embodiment, it comprises a standard television set.

The methods described below are used to determine the presence of one or more living beings, i.e. a human or animal, in a scene captured by the digital camera 2, by generating a signal on the basis of image data corresponding to a patch of skin, which signal varies with the frequency of a periodic physiological phenomenon, e.g. the heartbeat or breathing of a human being.

The human skin can be modeled as a two-layered object, one layer being the epidermis (a thin surface layer) and the other the dermis (a thicker layer underneath the epidermis). Approximately 5% of an incoming ray of light is reflected in the epidermis, which is the case for all wavelengths and skin colors. The remaining light is scattered and absorbed within the two skin layers in a phenomenon known as body reflectance (described in the Dichromatic Reflection Model). The epidermis behaves like an optical filter, mainly absorbing light. In the dermis, light is both scattered and absorbed. The absorption is dependent on the blood composition, so that the absorption is sensitive to blood flow variations. The optical properties of the dermis are generally the same for all human races. The dermis contains a dense network of blood vessels, about 10% of an adult's total vessel network. These vessels contract according to the blood flow in the body. They consequently change the structure of the dermis, which influences the reflectance of the skin layers. Consequently, the heart rate can be determined from skin reflectance variations, which is the principle underlying the method presented herein.

Figure 2:
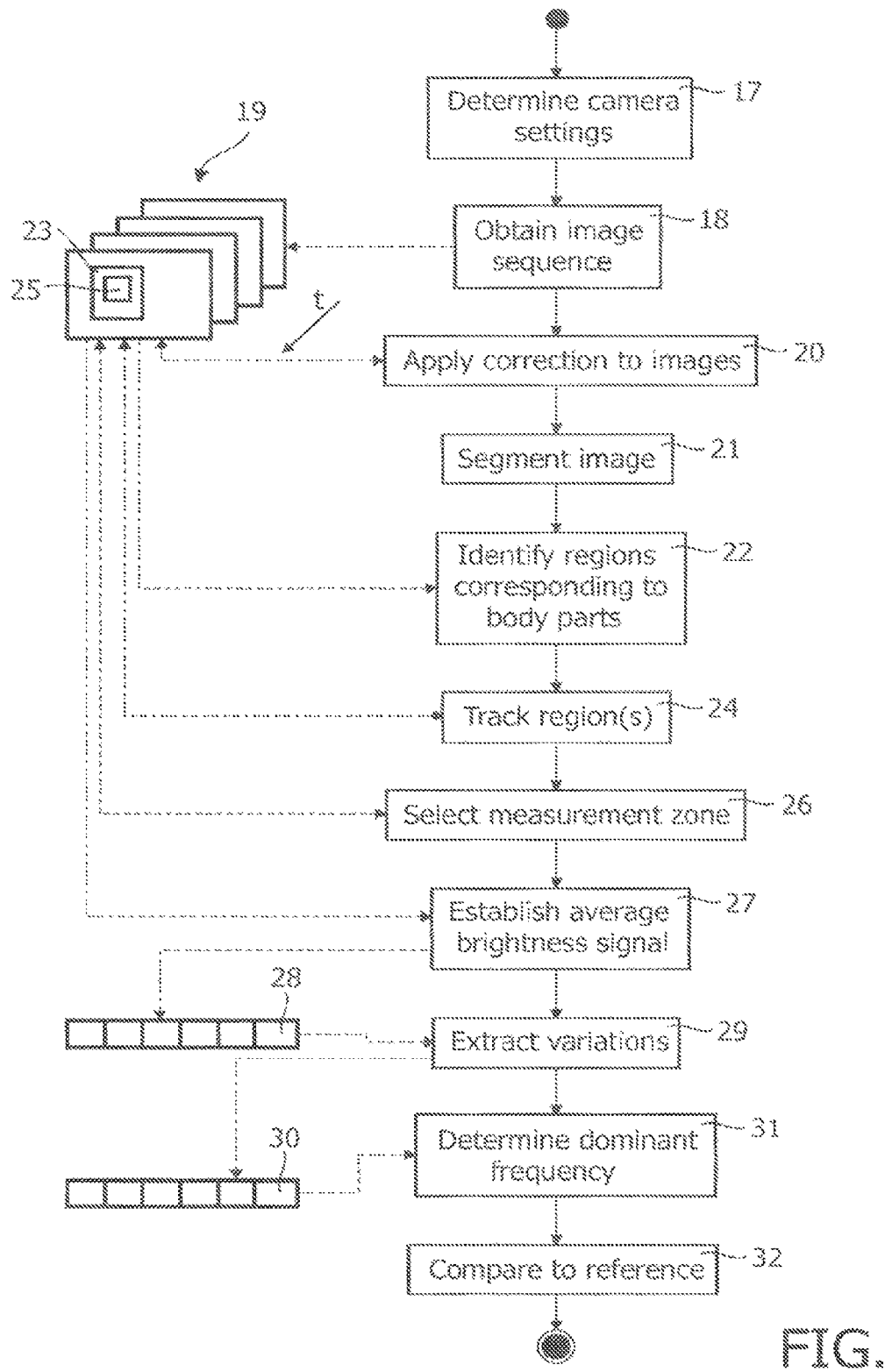
FIG. 2 is a flow chart illustrating a method for determining the heart rate or respiration rate of the living being.

In the embodiment of the method illustrated in FIG. 2, an initialization phase is completed first, in order to determine the appropriate settings for the digital camera 2 (step 17). To this end, the data processing device 3 causes at least one of the frame rate, exposure time, pixel clock (determines the rate at which pixel values are acquired) and gain of the camera channel of the digital camera 2 to be varied whilst a sequence of digital images is captured. The (spatial) average brightness of at least part of each image of the sequence is determined, and the magnitude of the periodic fluctuations in the average brightness is determined for each new value of the settings. Those settings for which the magnitude within at least a range of the spectrum, in particular a low-frequency range, is smallest are selected for subsequent use in the method. Instead of determining the spatial average brightness of at least a part of the image, an individual pixel's brightness fluctuations can be determined The effect of choosing the settings of the digital camera 2 is that periodic background lighting fluctuations are absent to the largest extent possible from the sequence of images to which the remainder of the method is applied.

In a next step 18, a sequence 19 of images is obtained from the digital camera 2. The sequence 19 of images represents a scene captured at successive points in time, which may be at regular or irregular intervals.

In a next step 20, the images 19 are processed in order to remove non-periodic background signals. To this end, a correction signal corresponding to a time-varying average brightness of part or all of the images 19 is formed. In the illustrated embodiment, the pixel data of the images 19 is then decorrelated from the correction signal. Algorithms for cancelling non-linear cross-correlations are known per se. Further image processing may take place at this stage 20, e.g. to compensate for camera motion.

In two next steps 21,22, an image segmentation algorithm is performed on at least one of the sequence 19 of digital images. In particular, an algorithm for detecting an image segment 23 representing a body part, generally the face, is carried out in these steps 21,22. A suitable algorithm is described in Viola, P. and Jones, M. J., "Robust real-time object detection", *Proc. of IEEE Workshop on statistical and computational theories of vision,* 13 Jul. 2001. Other suitable algorithms based on recognizing segments with certain shapes and/or colors (skin colors) are known and can be used instead of or in addition to this algorithm. One or more, for example all, distinct segments 23 determined to correspond to a body part of the desired type are tracked (step 24) through the sequence 19 of images. That is to say that the segment 23 is placed, i.e. its location determined, by comparing the images in the sequence 19 to quantify the movement of the body parts within the images 19. A suitable tracking algorithm is known, for example, from De Haan et al., "True-motion estimation with 3-D recursive search block matching", *IEEE Transactions on circuits and systems for video technology*, 3 (5), October 1993, pp. 368-379.

Subsequently, for each selected and tracked segment 23, a measurement zone 25 within the image segment 23 is selected (step 26). This step 26 involves a spatial analysis of the pixel data of a plurality of image parts—each image part being one or more image points in size—to determine a set of contiguous parts determined to have similar characteristics. This step 26 is carried out automatically by the data processing device 3. A suitable algorithm is an algorithm for detecting regions with minimal gradient variations. Those image parts belonging to the region are selected to form the measurement zone 25. In the illustrated embodiment, the position of the measurement zone 25 is determined by analysis of a key image in the sequence 19 of images. Its position relative to the segment 23 corresponding to a body part is determined, and it is thus tracked with the image segment 23 through the sequence 19 of images. Thus, it is determined which pixel of each of the images corresponds to a particular image point of the measurement zone 25 for all image points making up the measurement zone. In an alternative embodiment, certain image points are discarded, so that a sum of pixel values at fewer than all image points in the measurement zone 25 is taken. Moreover, the brightness may be a weighted sum of the color components or only the value of one color component. Green has been found to have the strongest signal.

Next (step 27), for each measurement zone 25, a signal 28 representative of the time-varying average brightness of the pixels corresponding to the image points of the measurement zone 25 is generated. For each image of the sequence 19, the average brightness of the pixels determined to be comprised in the measurement zone 25 is formed. Since each image of the sequence 19 represents a point in time, a time-varying (discrete-time) signal 28 is thus obtained. In the illustrated embodiment of FIG. 2, one measurement zone 25 is selected, so that only one signal 28 is generated. If there are more image segments 23 potentially corresponding to body parts, so that there are a number of measurement zones 25, then there will also be multiple signals 28.

Each first signal 28 is then centered on its mean value (step 29) to yield a further signal 30 representative of at least variations in the time-varying average brightness of pixels corresponding to the image points of the measurement zone 25. In a variant, this step 29 also comprises the decorrelation with the correction signal that is alternatively comprised in the step 20. In a different variant, this step 29 comprises a filtering operation, e.g. a filtering operation corresponding to differentiation of the signal. Other alternatives for extracting variations of the order of 1% of the first signal's dynamic range are possible.

Then (step 31), basic signal processing techniques are used to determine one or more local maxima of the spectrum of the signal 30, at least within a range known to comprise typical heart rate values and/or respiration rate values for the living beings of interest (generally humans).

In one embodiment, the frequency of the local maximum is compared (step 32) to a reference value stored in memory 6, to determine whether it matches to within a pre-determined interval around the reference value. This is done for each such second signal 30.

A first application of this embodiment of the method of FIG. 2 in the system of FIG. 1 involves detecting the presence of a living being, in particular a human being. To this end, an output representative of whether the presence of at least one peak in the spectrum corresponding to a frequency of the periodic physiological phenomenon is detected is used to control one or more of the peripheral devices to perform a function conditional on detecting a presence of at least one human being. If a human being is present, then, for example, the video display system 8 and the ambient system can continue to function. If not, they can be switched off or switched to a standby function. Thus, this application is an application in an energy-saving device. A similar application is to intelligent lighting systems for homes and offices. The detection of living beings by means of automated image analysis is less sensitive to false alarms, e.g. due to pets.

A similar application is to control a conditional access system, e.g. one including the biometric scanning device 13. In an embodiment, this can be a fingerprint scanner. Using the detection of living beings, it is ensured that e.g. wax casts of a person's finger cannot be used to fool the conditional access system. A conditional access system using only the camera 2 (e.g. to scan a person's iris or face) can also benefit from the additional use of the method of FIG. 2 to determine that a living person is actually in front of the camera lens.

Alternatively or additionally, the method of FIG. 2 is used to provide biofeedback to a user. More particularly, at least the ambient system is caused to adapt its output in dependence on the frequency determined in the last step 31 of the method. For example, the color or intensity of light emitted by the lighting units 10,11,12 can be changed in dependence on the heart rate. To this end, the method of FIG. 2 is carried out in real-time on a sequence comprising the last N digital images obtained by the data processing device 3. N depends on the image capture rate, and is chosen in dependence on the image capture rate to cover a sequence spanning a time interval long enough to cover at least two heartbeats of an average human being, e.g. at least four seconds long. In this application, the value of the frequency at the local maximum in the spectrum is used as an input to an algorithm for adapting the output of the lighting units 10,11,12 and/or of the video display system 8 in dependence on the heart rate and/or respiration rate of the individual watching.

If, in a variant of the method of FIG. 2, multiple measurement zones 25 are selected, and multiple average signals 30 are established, the comparison step 32 can comprise multiple comparisons. In particular, having filtered out those measurement zones 25 that do not correspond to living beings, there can be a comparison between the frequencies of the local maxima for the different measurement zones 25 in order to determine how many persons are present.

In one embodiment, this information is used to segment the images 19 into segments corresponding to distinct living beings.

In another embodiment, this information is used to determine the current heart rate and/or respiration rate of multiple individuals. The feedback provided using the ambient system is then made dependent on the heart rate of multiple users. It can also be spatially targeted and differentiated by spatial target. For each measurement zone 25 corresponding to a spatial target, the output of the ambient system and/or video display system 8 is adapted in dependence on the value of the frequency of the local maximum in the spectrum of the associated signal 30.

Figure 3:
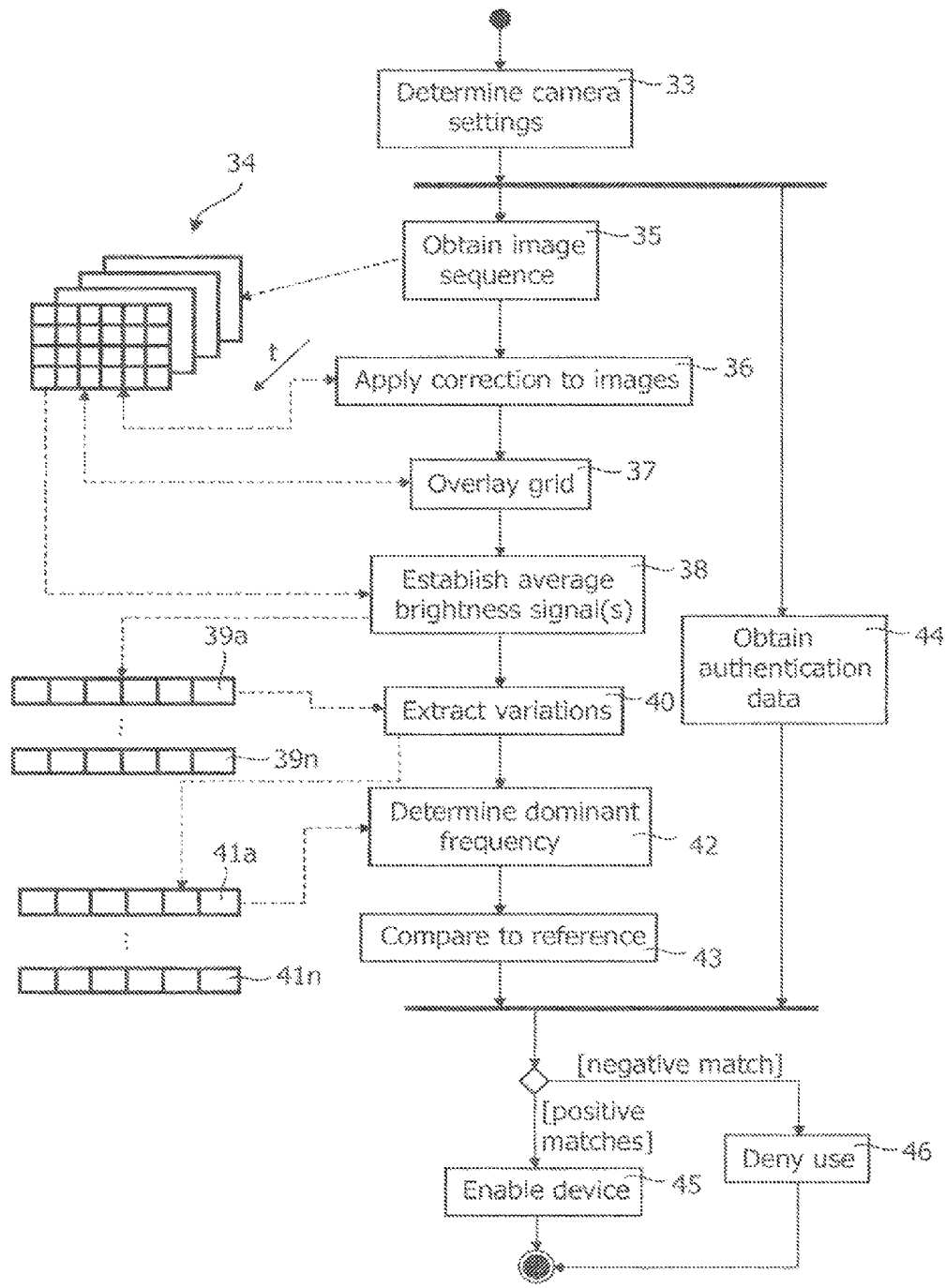
FIG. 3 is a flow chart illustrating an alternative method for detecting the presence of a living being.

FIG. 3 shows an alternative method for use in particular with the biometric scanning device 13.

This method also commences with an initialization phase 33 for determining the appropriate settings for the digital camera 2. The data processing device 3 causes at least one of the frame rate and exposure time of the digital camera 2 to be varied whilst a sequence of digital images is captured. The (spatial) average brightness of at least part of each image of the sequence is determined, and the magnitude of the periodic fluctuations in the average brightness is determined for each new value of the settings. Those settings for which the magnitude within at least a range of the spectrum, in particular a low-frequency range, is smallest are selected for subsequent use in the method. Instead of determining the spatial average brightness of at least a part of the image, an individual pixel's brightness fluctuations can be determined After the initialization phase 33, a sequence 34 taken at consecutive points in time is obtained (step 35). The sequence 34 of images represents a scene captured at successive points in time, which may be at regular or irregular intervals. The scene includes a person presenting his or her credentials to the biometric scanning device 13.

In a next step 36, the images 34 are processed in order to remove non-periodic background signals. To this end, a correction signal corresponding to a time-varying average brightness of part or all of the images 34 is formed. In the illustrated embodiment, the pixel data of the images 34 is then decorrelated from the correction signal. Further image processing may take place at this stage 36, e.g. to compensate for camera motion.

Instead of applying an image segmentation method based on shape and/or color recognition as in the method of FIG. 2, a grid is laid over each of the images 34 (step 37) which grid partitions each image into a plurality of measurement zones, or potential measurement zones. Each measurement zone includes a plurality of image points, i.e. multiple pixel locations.

Then (step 38) at least one, but generally all of the measurement zones are selected, and, for each measurement zone, a respective signal 39a-n corresponding to the time-varying spatial average of brightness values of pixels in the images 34 corresponding to the image points of that measurement zone is established.

Each first signal 39a-n is then centered on its mean value (step 40) to yield a further signal 41a-n representative of the time-varying average brightness of pixels corresponding to the image points of the associated measurement zone, the better to observe variations in it. In a variant, this step 40 also comprises the decorrelation with the correction signal that is alternatively comprised in the step 36. In a different variant, this step 40 comprises a filtering operation, e.g. a filtering operation corresponding to differentiation of the signal. Other alternatives for extracting variations in the order of 1% of the first signal's dynamic range are possible.

The frequency at which the spectrum of the signal 41a-n has a local maximum within a certain range is then determined (step 42). This is then compared (step 43) to a stored reference value that is representative of the heart rate or respiration rate of an average individual.

At the same time, the biometric scanning device 13 is operated to obtain authentication data (step 44) for verifying the identity of the person in the image.

Only if at least one of the second signals 41a-n representative of at least variations in the time-varying spatial average of brightness values of pixels in the image corresponding to the image points of an associated measurement zone has a spectrum with a local maximum at a frequency matching the reference frequency to within a certain accuracy and the authentication data matches stored data, is access to the system 1 enabled (step 45). Otherwise, use of the system 1 is denied (step 46).

In a variant of the method of FIG. 3, the authentication step 44 is omitted. This variant is a general method in which a function is performed conditional on detecting the presence of at least one living being or living being of a certain kind. For example, the lighting units 10-12 can be switched on and off in dependence on whether a living being, or a human being, is detected. As another example, it is known that the average heart rate changes as one becomes older. Thus, a parental control function could use a comparison (step 32) with a value typical of an adult to determine whether an adult or a child is seeking to use the system 1.

Figure 4A:
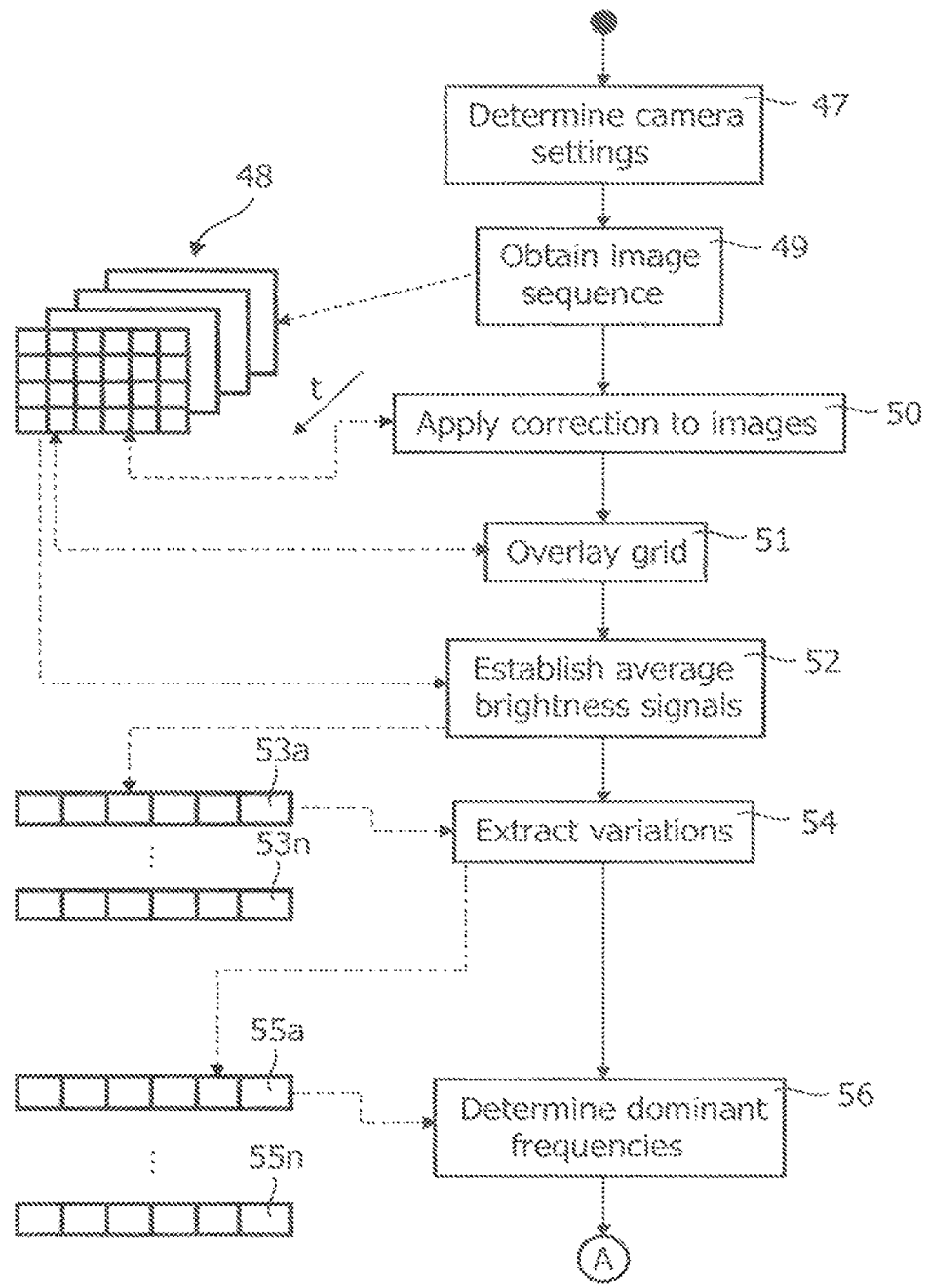
FIGS. 4A and 4B are a flow chart illustrating a third method for detecting the presence of a living being, which also allows for the provision of targeted feedback to the living beings.
Figure 4B:
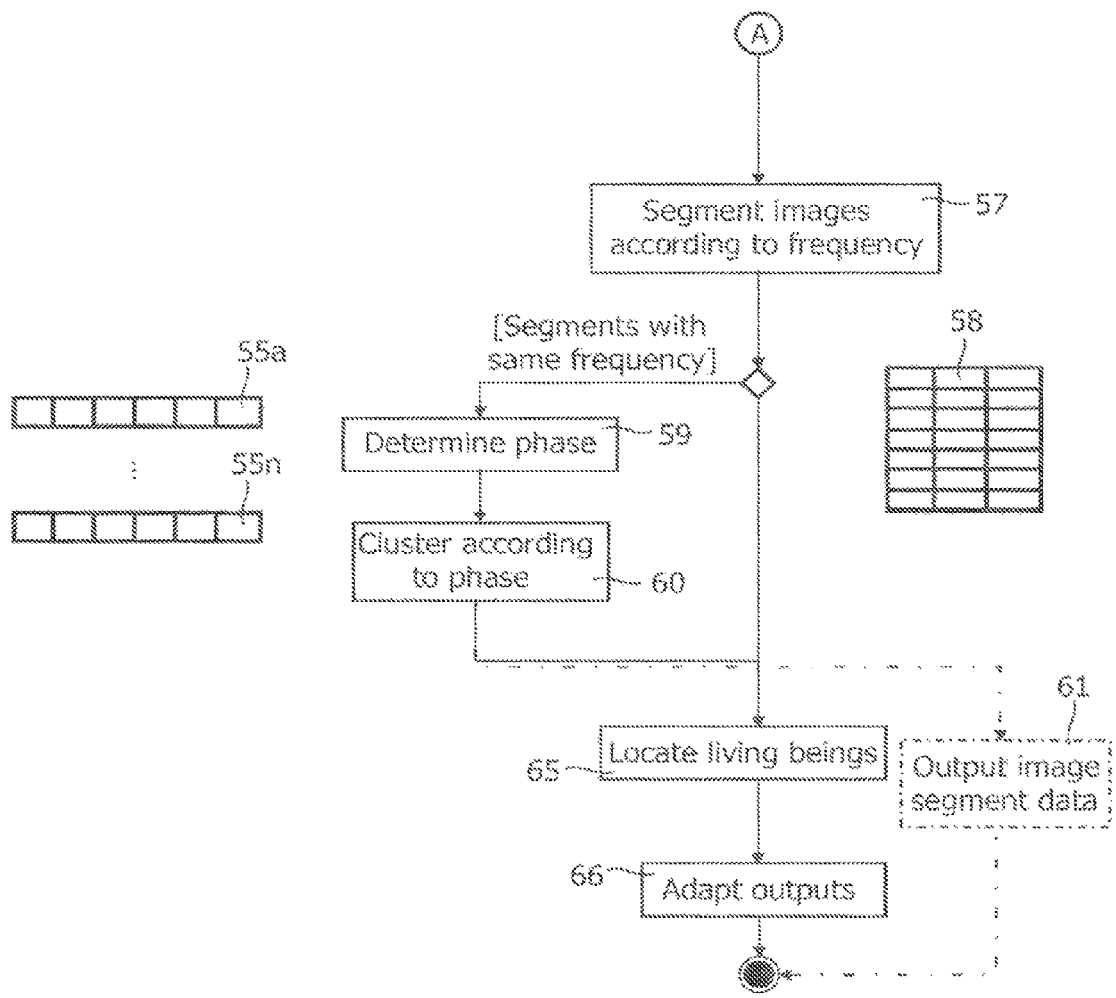

FIGS. 4A and 4B illustrate a further method of controlling a function of the system 1. The function can be an image segmentation function or a function for rendering perceptible output using at least one of the ambient system and the video display system 8.

This method again commences with an initialization phase 47 for determining the appropriate settings for the digital camera 2. The data processing device 3 causes at least one of the frame rate and exposure time of the digital camera 2 to be varied whilst a sequence of digital images is captured. The (spatial) average brightness of at least part of each image of the sequence is determined, and the magnitude of the periodic fluctuations in the average brightness is determined for each new value of the settings. Those settings for which the magnitude within at least a range of the spectrum, in particular a low-frequency range, is smallest are selected for subsequent use in the method. Instead of determining the spatial average brightness of at least a part of the image, an individual pixel's brightness fluctuations can be determined After the initialization phase 47, a sequence 48 of images taken at consecutive points in time is obtained (step 49). The sequence 48 of images represents a scene captured at successive points in time, which may be at regular or irregular intervals. The scene will generally include multiple human beings.

In a next step 50, the images 48 are processed in order to remove non-periodic background signals. To this end, a correction signal corresponding to a time-varying average brightness of part or all of the images 48 is formed. In the illustrated embodiment, the pixel data of the images 48 are then decorrelated from the correction signal. Further image processing may take place at this stage 50, e.g. to compensate for camera motion.

As in the method of FIG. 3, a grid is laid over each of the images 48 (step 51) which grid partitions each image into a plurality of measurement zones, or potential measurement zones. Each measurement zone includes a plurality of image points, i.e. multiple pixel locations.

Then (step 52) all of the measurement zones are selected, and, for each measurement zone, a respective signal 53a-n corresponding to the time-varying spatial average of brightness values of pixels in the images 48 corresponding to the image points is established.

Each first signal 53a-n is then centered on its mean value (step 54) to yield a further signal 55a-n representative of at least variations in the time-varying average brightness of pixels corresponding to the image points of the associated measurement zone. In a variant, this step 54 also comprises the decorrelation with the correction signal that is alternatively comprised in the step 50. In a different variant, this step 54 comprises a filtering operation, e.g. a filtering operation corresponding to differentiation of the signal. Other alternatives for extracting variations in the order of 1% of the first signal's dynamic range are possible.

The frequencies at which the spectra of the signals 55*a-n* have a local maximum within a certain range are then determined (step 56). These are then compared to each other in order to segment the images 48 according to frequency (step 57). In other words, measurement zones associated with a signal 55 with a local maximum at a common frequency, at least to a certain accuracy, are clustered together if they are contiguous.

The result is a table 58 of image segments with associated frequency values and location information.

It may happen that segments that are spaced apart are associated with essentially the same frequency value. In that case, the phase of at least one of the further signals 55*a-n* associated with a measurement zone in that segment is determined (step 59). At least the measurement zones associated with a further signal 55*a-n* having a spectrum with a local maximum at the common frequency are then clustered according to phase (step 60). This entails determining whether at least certain frequency components of the signals are in phase with each other to a certain pre-determined accuracy. Generally, the phase comparison will be carried out for the frequency component corresponding to the dominant frequency determined previously (step 56).

For efficiency, the determination of whether at least a certain frequency component of the signal of a measurement zone is in phase with the same frequency component of the signal of a further measurement zone is only carried out if the signals obtained for the measurement zones have spectra with respective local maxima at a common frequency. In an alternative embodiment, however, a phase map of the entire area covered by the images 48 is made.

FIG. 4B shows two alternative applications of the same basic method. A first application of the method is to image segmentation. A second application is to a system for adapting environmental conditions to users' psychophysical condition.

In the image segmentation method, image segment data for identifying the segments obtained in the clustering step 60 or step 57 are output by the data processing device 3. This method is able to output image segments corresponding to the faces of living persons even when the images of the persons have been captured at unusual angles or are distorted due to the use of a wide-angle lens. Thus the method is more stable than one based purely on the recognition of certain shapes or colors. Moreover, only image segments corresponding to actual living persons are obtained. The method is able to discern between living persons and reproductions of living persons, such as pictures, drawings or mannequins. Because the brightness variations occur for all skin colors, the method is independent of race.

Figure 5:
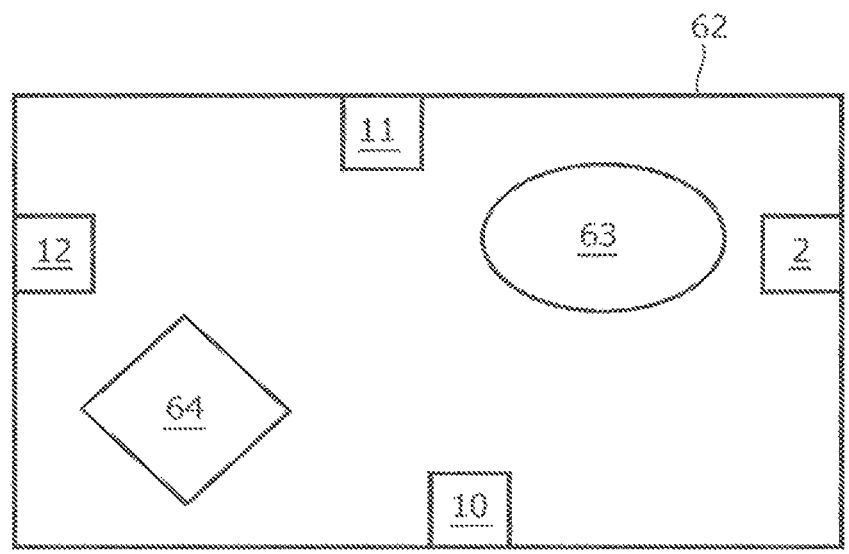
FIG. 5 is a diagram of an environment in which an ambient system comprised in the system of FIG. 1 is implemented.

The second application involves locating the living beings detected using the clustering steps 60,57 within an environment 62, e.g. a room (see FIG. 5), in which the camera 2, lighting units 10-12 and video display system 8 have been placed. In the example of FIG. 5, a first region 63 corresponds to the location of one living person and a second region 64 corresponds to the location of a second living person.

The controller 9 and thus the lighting units 10-12 are controlled (step 66) to provide spatially targeted output differentiated by spatial target in dependence on whether the target is determined to correspond to one of the regions 63,64. More particularly, the output is adapted according to the heart rate and/or respiration rate of the individual determined to be present in the region 63,64. Thus, the light directed at the first region 63 can have different characteristics from the light directed at the second region 64. Differences can include any one of light, brightness, dynamics of lighting variations, etc.

Similarly, the output of the video display system 8 can be adapted. In particular when the video display system 8 comprises a three-dimensional imaging system, the depth and viewing cone can be adapted to the person watching in dependence on e.g. the heart rate. Other variables that can be adapted include the color depth, contrast and similar aspects of the display. It is also possible to vary the information content according to the heart rate and/or respiration rate of the person at which the display is targeted. Using the method of FIGS. 4A and 4B, the system 1 is able to determine how many distinct regions 63,64 there are at which to target differentiated, personalized output.

It should be noted that the above-mentioned embodiments illustrate, rather than limit, the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

The methods outlined herein can be carried out on a single color component of the pixel data or on a weighted sum of two or more of the color components (Red, Green and Blue or Cyan, Magenta, Yellow and Key, for example).

The invention claimed is:

1. Method of controlling a function of a device, including:
receiving a sequence of digital images taken at successive points in time using a camera;
selecting at least one measurement zone including a plurality of image points;
for at least one measurement zone, obtaining a signal representative of at least variations in a time-varying value of a combination of pixel values at at least a number of the image points, and determining at least one characteristic of the signal within at least a range of interest of its spectrum relative to comparison data, the determination comprising at least one of (i) determining whether the signal has a spectrum with a local maximum at a frequency matching a comparison frequency to a certain accuracy and (ii) determining whether at least a certain frequency component of the signal is in phase with a comparison signal to a certain accuracy; and
controlling the function in dependence on the determination, wherein the method is unobtrusive to a living being present in a field of view of the camera, and wherein the living being can be in motion.

2. Method according to claim 1, wherein the comparison data are based on at least one signal representative of at least variations in a time-varying value of a combination of pixel values of at least a number of image points of a further selected measurement zone.

3. Method according to claim 2, wherein each further selected measurement zone is one of a number of measurement zones in a grid laid over the images.

4. Method according to claim 2, wherein the determination of whether at least a certain frequency component of the signal is in phase with a comparison signal to a certain accuracy is carried out if the signals obtained for the measurement zone and at least one further measurement zone spaced apart therefrom are determined to have spectra with respective local maxima at a frequency common to the measurement zone and the at least one further measurement zone to a certain accuracy.

5. Method according claim 1, further comprising controlling the device to provide spatially targeted output differentiated by spatial target in dependence on the determination made for a measurement zone corresponding to a target.

6. Method according to claim 5, wherein the device has a perceptible output and, for at least one measurement zone corresponding to a target, the perceptible output is adapted in dependence on a value of the frequency of the local maximum.

7. Method according to claim 1, wherein at least one device is made operative in dependence on the determination.

8. Method according to claim 7, wherein the device of which the function is controlled is included in a conditional access system.

9. Method according to claim 1, further comprising: causing the sequence of digital images to be captured by the camera upon completion of an initialization phase, the initialization phase including:
    measuring periodic intensity fluctuations in at least parts of images acquired by the camera whilst camera settings are varied, and
    selecting values of the camera settings at which measured periodic intensity fluctuations in at least a range of frequencies are determined to be minimal.

10. Method according to claim 1, further comprising:
    determining a correction signal corresponding to a time-varying value of a combination of pixel values at at least a number of image points in an image part other than a measurement zone, and
    for each measurement zone, decorrelating at least one of the pixel data of the images in at least the measurement zone and the time-varying value of a combination of pixel values at at least a number of the image points in the measurement zone from the correction signal.

11. Method according to claim 1, wherein the comparison data is selected from the group consisting of heart rate and respiration rate.

12. System for detecting the presence of a living being, comprising:
    a data processing device having a processor configured to receive a sequence of digital images taken at successive points in time by a camera, the data processing device configured to:
    select at least one measurement zone including a plurality of image points;
    for at least one measurement zone, obtain a signal representative of at least variations in a time-varying value of a combination of pixel values at at least a number of the image points, and
    determine at least one characteristic of the signal within at least a range of interest of its spectrum relative to comparison data, the determination comprising at least one of (i) determining whether the signal has a spectrum with a local maximum at a frequency matching a comparison frequency to a certain accuracy and (ii) determining whether at least a certain frequency component of the signal is in phase with a comparison signal to a certain accuracy; and
    adapt its output in dependence on a determination, wherein the system is unobtrusive to a living being present in a field of view of the camera, and wherein the living being can be in motion.

13. System according to claim 12, wherein the comparison data are based on the at least one signal representative of at least variations in a time-varying value of a combination of pixel values at at least a number of image points of a further selected measurement zone.

14. System according to claim 13, wherein each further selected measurement zone is one of a number of measurement zones in a grid laid over the images.

15. System according to claim 13, wherein the determination of whether at least a certain frequency component of the signal is in phase with a comparison signal to a certain accuracy is carried out if the signals obtained for the measurement zone and at least one further measurement zone spaced apart therefrom have spectra with respective local maxima at a frequency common to the measurement zone and the at least one further measurement zone to a certain accuracy.

16. System according claim 12, further comprising controlling the device to provide spatially targeted output differentiated by spatial target in dependence on a determination made for a measurement zone corresponding to a target.

17. System according to claim 16, wherein, for at least one measurement zone corresponding to a target, the perceptible output is adapted in dependence on a value of the frequency of the local maximum.

18. System according to claim 16, wherein at least one device operates in dependence on the determination.

19. System according to claim 16, wherein the controlled device is included in a conditional access system.

20. System according to claim 12, wherein the comparison data is selected from the group consisting of heart rate and respiration rate.

21. System according claim 12, wherein the system includes at least one device for providing a perceptible output, and wherein the system includes means for controlling the device to provide spatially targeted output differentiated by spatial target in dependence on whether a determination made for a measurement zone corresponding to a target is positive.

22. System according to claim 21, wherein, for at least one measurement zone corresponding to a target, the perceptible output is adapted in dependence on a value of the frequency of the local maximum.

23. System according to claim 21, wherein at least one device is made operative in dependence on whether the determination is positive.

24. System according to claim 21, wherein the device of which the function is controlled is included in a conditional access system.

25. System according to claim 12, wherein the sequence of digital images is caused to be captured by the camera upon completion of an initialization phase, the initialization phase including:
    measuring periodic intensity fluctuations in at least parts of images acquired by the camera whilst camera settings are varied, and
    selecting values of the camera settings at which measured periodic intensity fluctuations in at least a range of frequencies are determined to be minimal.

26. System according to claim 12, the data processing device further configured to:
    determine a correction signal corresponding to a time-varying value of a combination of pixel values at at least a number of image points in an image part other than a measurement zone, and
    for each measurement zone, decorrelate at least one of the pixel data of the images in at least the measurement zone and the time-varying value of a combination of pixel values at at least a number of the image points in the measurement zone from the correction signal.

* * * * *